United States Patent
John et al.

(10) Patent No.: US 10,984,346 B2
(45) Date of Patent: *Apr. 20, 2021

(54) SYSTEM AND METHOD FOR COMMUNICATING TAGS FOR A MEDIA EVENT USING MULTIPLE MEDIA TYPES

(75) Inventors: Ajita John, Holmdel, NJ (US); Shreeharsh Kelkar, Summit, NJ (US); Doree Duncan Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 673 days.

This patent is subject to a terminal disclaimer.

(21) Appl. No.: 12/847,929

(22) Filed: Jul. 30, 2010

(65) Prior Publication Data

US 2012/0030232 A1    Feb. 2, 2012

(51) Int. Cl.
*G06F 7/00* (2006.01)
*G06Q 10/00* (2012.01)
*H04W 4/50* (2018.01)

(52) U.S. Cl.
CPC .............. *G06Q 10/00* (2013.01); *H04W 4/50* (2018.02)

(58) Field of Classification Search
USPC ........................................ 707/792, 790, 821
See application file for complete search history.

(56) References Cited

U.S. PATENT DOCUMENTS

| | | | |
|---|---|---|---|
| 7,890,490 B1 * | 2/2011 | Bovenschulte ........ | G06Q 30/02 707/708 |
| 8,359,320 B2 * | 1/2013 | Howcroft ................ | G06F 16/48 707/756 |
| 9,465,892 B2 * | 10/2016 | Shamma ................ | G06F 16/435 |
| 2004/0199494 A1* | 10/2004 | Bhatt ....................... | G06F 16/40 |
| 2006/0047767 A1* | 3/2006 | Dodrill et al. ................ | 709/206 |
| 2006/0095410 A1* | 5/2006 | Ostrover ................ | H04N 7/163 |
| 2008/0021861 A1* | 1/2008 | Fitzsimons et al. ............. | 707/1 |
| 2008/0189633 A1* | 8/2008 | Boyle .................... | G06Q 10/10 715/764 |
| 2008/0250358 A1* | 10/2008 | Mitchem ................ | G11B 27/34 715/855 |
| 2008/0267432 A1* | 10/2008 | Becker ................... | B42D 3/123 381/300 |
| 2009/0006342 A1* | 1/2009 | Wong ................... | G06F 16/3337 |
| 2009/0094190 A1* | 4/2009 | Stephens ............. | G06F 3/04847 |
| 2009/0228492 A1* | 9/2009 | Valdez .................... | G06F 16/48 |
| 2009/0271380 A1* | 10/2009 | Julia ................. | G06F 17/30746 |

(Continued)

*Primary Examiner* — Eliyah S. Harper
(74) *Attorney, Agent, or Firm* — Sheridan Ross P.C.

(57) ABSTRACT

Disclosed are systems, methods, and non-transitory computer-readable storage media for exchanging and processing tag information between users with different types of communications devices. In operation, tag information is received processed to provide an alternative tag communication to selected participants in the media event. That is, at least a portion of the tags of a media event are used to create an alternate tag communication that can be delivered to participants, together with or separate from the conventional or default tag communication associated with the media event. The alternate tag communications can be used to allow participation of users associated with communications devices incompatible with the media format of default tag communication. Further, the alternate tag information can also be used as a secondary means of communications during a media event.

20 Claims, 5 Drawing Sheets

(56) References Cited

U.S. PATENT DOCUMENTS

| | | | |
|---|---|---|---|
| 2009/0299725 A1* | 12/2009 | Grigsby | G06F 16/78 704/2 |
| 2010/0042653 A1* | 2/2010 | Krishnan et al. | 707/104.1 |
| 2010/0211535 A1* | 8/2010 | Rosenberger | G06F 16/48 706/20 |
| 2010/0229082 A1* | 9/2010 | Karmarkar | H04L 67/303 715/205 |
| 2011/0016103 A1* | 1/2011 | Sivakumar | G06F 16/41 707/706 |
| 2011/0116610 A1* | 5/2011 | Shaw | H04W 4/18 379/88.04 |
| 2011/0143718 A1* | 6/2011 | Engelhart, Sr. | H04L 51/066 455/412.1 |
| 2011/0145258 A1* | 6/2011 | Kankainen | G06Q 10/10 707/746 |

* cited by examiner

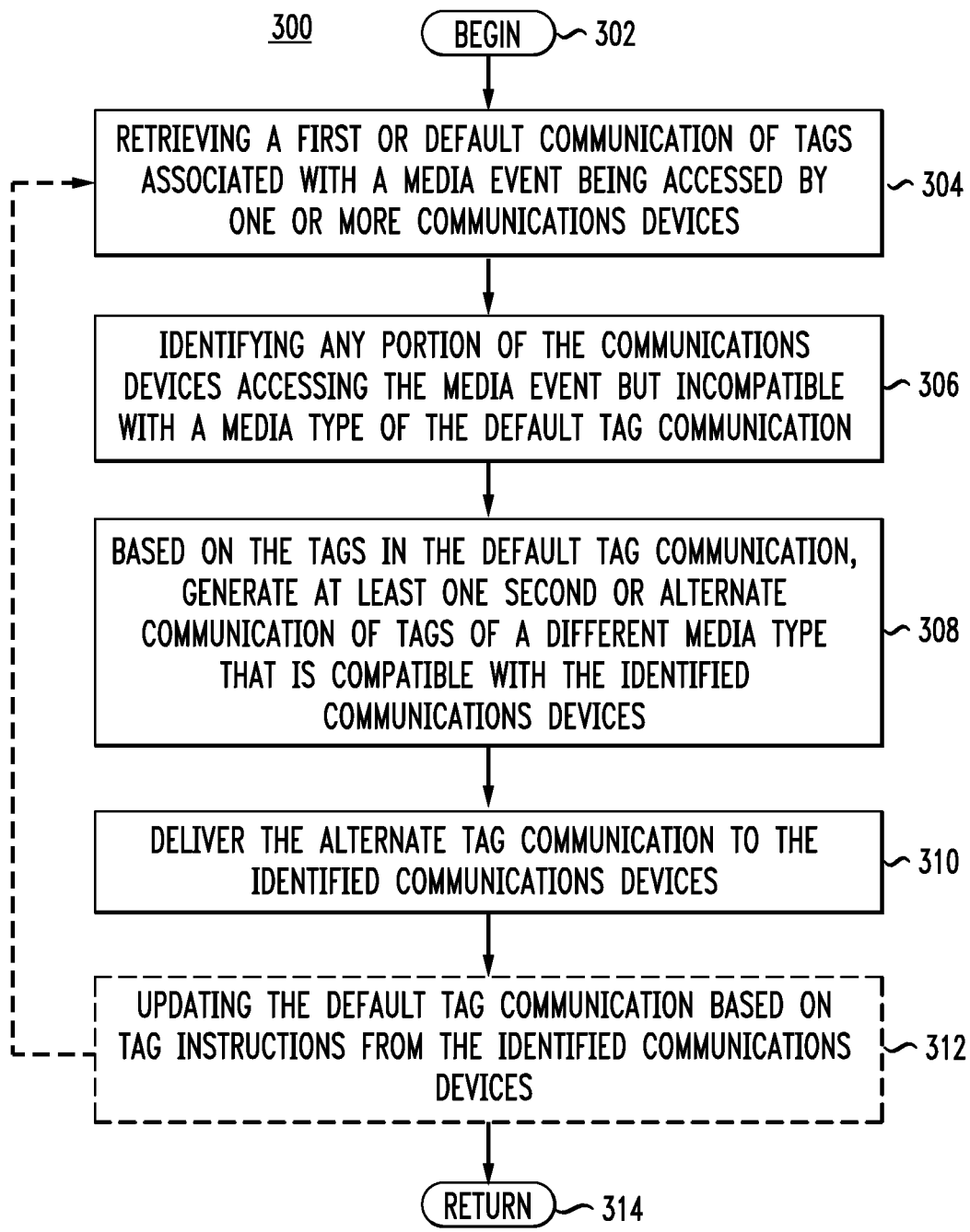

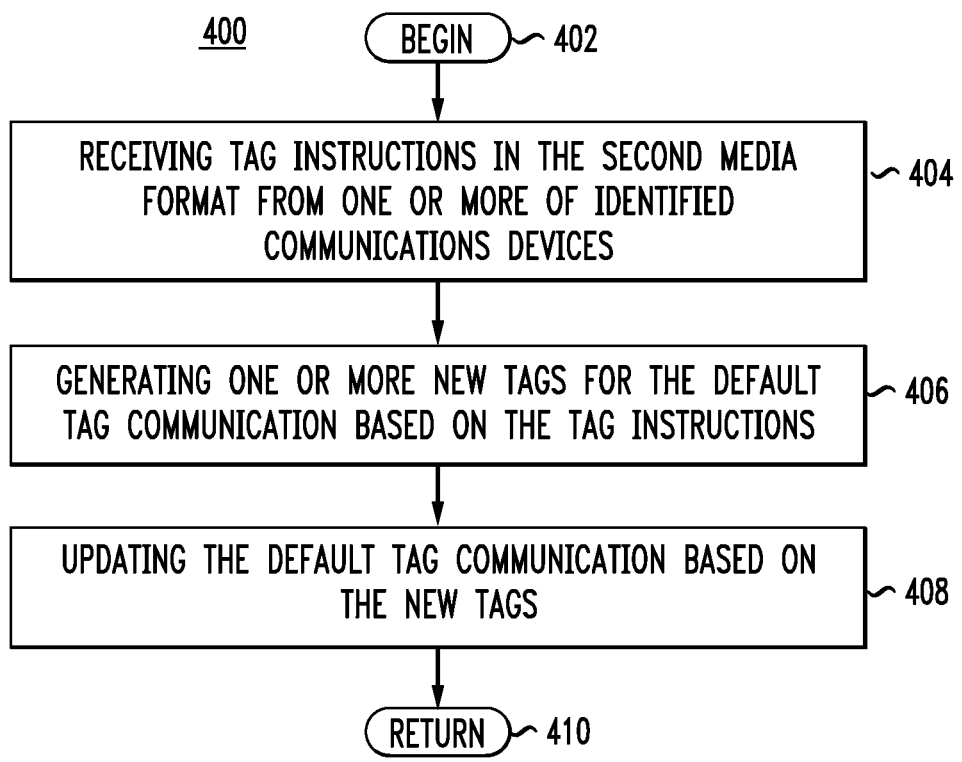

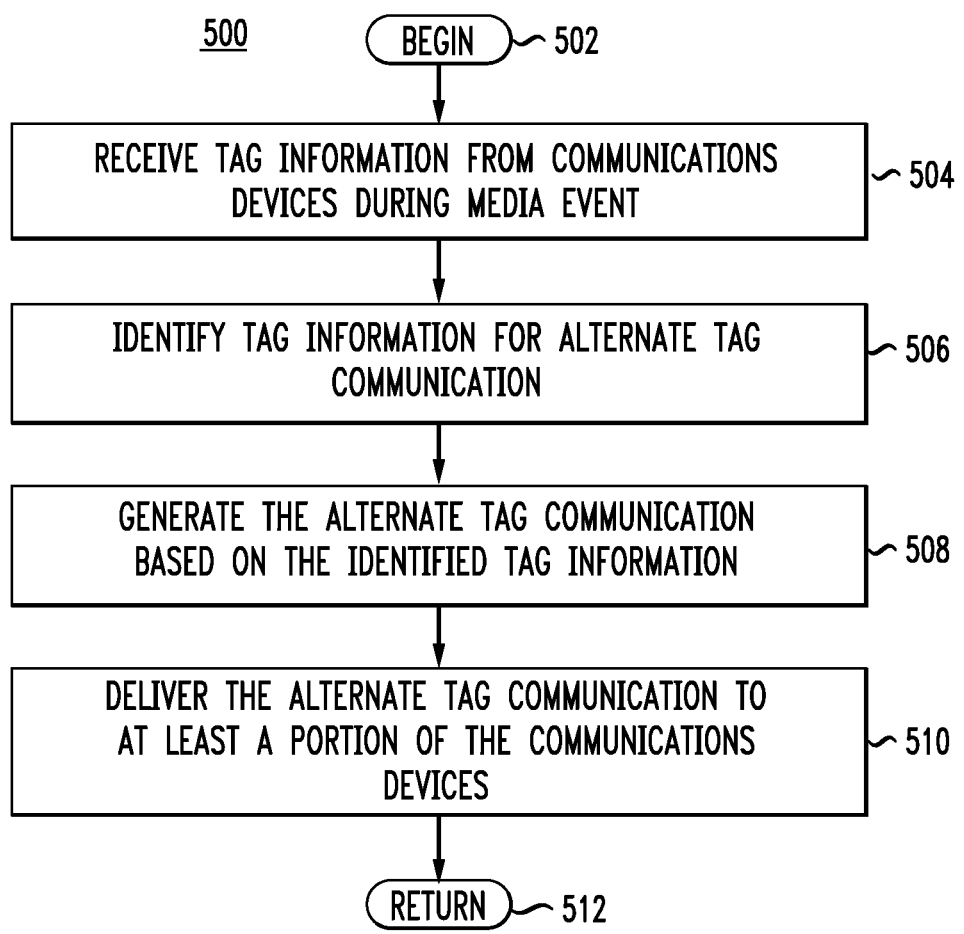

SYSTEM AND METHOD FOR COMMUNICATING TAGS FOR A MEDIA EVENT USING MULTIPLE MEDIA TYPES

BACKGROUND

1. Technical Field

The present disclosure relates to tagging of media event and more specifically to systems and methods for communicating tags for media events.

2. Introduction

A conventional tag cloud or word cloud (or weighted list in visual design) generally provides a visual depiction of user-generated tags, metadata, or content of a web site or other on-line content. Tags in a tag cloud are usually single words and are normally listed alphabetically, and the importance of a tag is shown with font size or color. Thus, it is possible to find a tag alphabetically and by popularity. The tags can also provide hyperlinks that lead to content, at the web site or other web sites, which is associated with the tags.

Tag clouds can also be used to provide a summary of tags for other types of media events, such as teleconferences, video conferences, and television broadcasts, in real time or thereafter. For example, during a concert, users viewing the event can tag portions of the concert with tags such as "nice guitar solo", "Hotel California", or "MP3 available at iTunes". Thereafter, the tags can be summarized as a tag cloud. Accordingly, a user can thereafter view the tag cloud and obtain a summary of the media event based on other users' tagging and the frequency and/or importance of the tags to these other users. Unfortunately, as tag clouds for media events are an offshoot of tag clouds for web sites and other on-line content, such tag clouds are typically limited to displaying an overall summary of tags associated with a media event.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for exchanging and processing tag information associated with a media event. In the various embodiments, the system receives information as tags and processes the tags to provide an alternative tag communication to participants of the media event. That is, at least a portion of the tags are a basis for creating an alternate communication of tags that can be delivered to participants, separate from the conventional or default tag communication associated with the media event. In one embodiment, the alternate tag communication is provided to allow participants at various types of communications devices to receive and provide information associated with the tag cloud for the media event. In particular, a compatible, alternate tag communication can be generated for users associated with communications devices supporting a media format that is incompatible with the media format of default tag communication. Further, tag information in such a media format can be received from such participants and integrated into the default tag communication.

In another embodiment, the alternate tag information can also be used as a secondary means of communications during a media event. In particular, selected tag information can be included in an alternate tag communication delivered to at least a portion of the participants. Such alternate tag communications can be delivered as part of or separate from a media stream associated with the media event or the default tag communication.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 is a flowchart of steps in an exemplary method for communicating tags associated with an online content or a media event to users using multiple media types;

FIG. 4 is a flowchart of steps in an exemplary method for updating tags for a media event based on tag instructions received in multiple media types; and FIG. 5 is a flowchart of steps in an exemplary method for providing interaction between participants in a media event via an alternate tag communications.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

As described above, tag clouds can be a useful technique for summarizing the significance of tags associated with online content or a media event. However, while such tag clouds may be used to provide an overall summary of tags associated with the online content or media event, such conventional tag clouds are generally configured for presenting the tags visually. Accordingly, when users join a media event via a communications device lacking display capabilities or only having limited display capabilities, such as a telephone, there is generally no mechanism for presenting the information the tag cloud to these users. Further, there is generally no mechanism for users at such communications devices to provide information for updating the tag cloud.

One aspect of the present disclosure addresses the need in the art for allowing participants access to tags of a media event, regardless of the type of communications device being used by the participants. In particular a system, method and non-transitory computer-readable media are disclosed herein for presenting users the tags of a media event by generating alternate communications of tags in media formats accessible by participants at various types of communications devices. In operation, a server or other system managing the media event detects the presence of communications devices incompatible with a media format or type being used for a conventional tag communication. Thereafter, alternate tag communications are generated for these devices, in a media format accessible at the various communications devices associated with the participants. In another aspect of the present disclosure, the server can be configured to detect signals from such devices as tag instructions and use these instructions to update the tags for the media event. In yet another aspect of the present disclosure, the alternate tag communication can be used as a secondary means of communications between users. Accordingly, a collaborative environment can be provided during a media event using a wide range of communications devices. An exemplary environment for such collaborative media events supporting tagging is illustrated with respect to FIG. 1.

Figure 1:
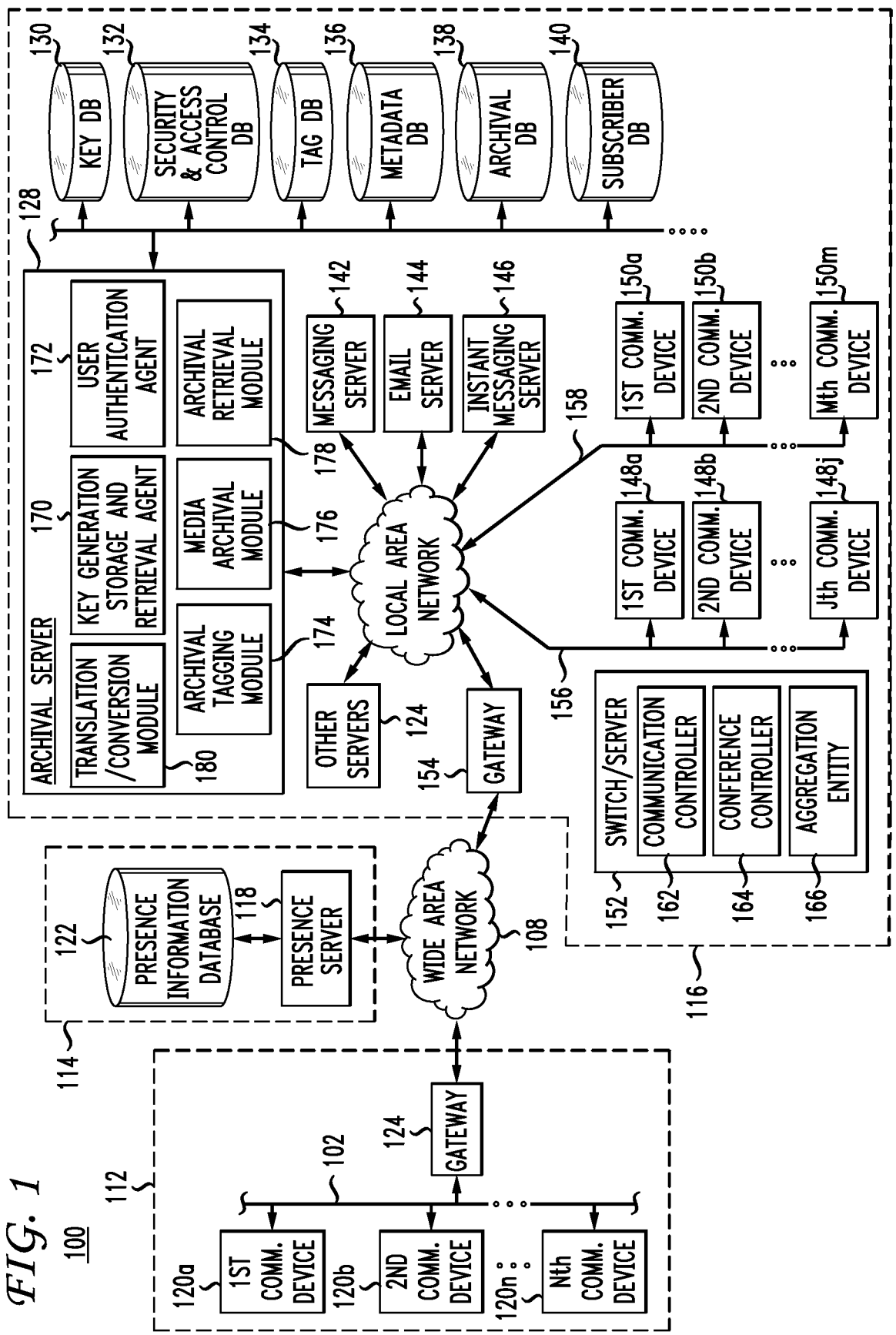
FIG. 1 is a block diagram of an exemplary communications architecture for supporting tagging during a media event.

FIG. 1 is a block diagram of an exemplary communications architecture 100 for supporting tagging during a media event. Although communications architecture 100 will be described below as including specific number and types of components, this is for illustrative purposes. Rather, the present disclosure contemplates the use of other architectures, including architectures with more or less components than shown in FIG. 1.

As shown in FIG. 1, first and second enterprise Local Area Networks (LANs) 102 and 104 and presence service 114 are interconnected by one or more Wide Area private and/or public Network(s) (WANs) 108. The first and second LANs 102 and 104 correspond, respectively to first and second enterprise networks 112 and 116.

As used herein, the term "enterprise network" refers to a communications network associated and/or controlled by an entity. For example, enterprise networks 112 and 116 can be a communications network managed and operated by a telephony network operator, a cable network operator, a satellite communications network operator, or a broadband network operator, to name a few.

The first enterprise network 112 includes communication devices 120a, 120b . . . 120n (collectively "120") and a gateway 124 interconnected by the LAN 102. The first enterprise network 112 may include other components depending on the application, such as a switch and/or server (not shown) to control, route, and configure incoming and outgoing contacts.

The second enterprise network 116 includes a gateway 124, an archival server 128 maintaining and accessing a key database 130, a security and access control database 132, a tag database 134, a metadata database 136, an archival database 138, and a subscriber database 140, a messaging server 142, an email server 144, an instant messaging server 146, communication devices 148a, 148b, . . . , 148j (collectively "148"), communication devices 150a, 150b, . . . , 150m (collectively "150"), a switch/server 152, and other servers 154. The two enterprise networks may constitute communications networks of two different enterprises or different portions a network of single enterprise.

A presence service 114, which can be operated by the enterprise associated with one of networks 104 and 108, includes a presence server 118 and associated presence information database 122. The presence server 118 and presence information database 122 collectively track the presence and/or availability of subscribers and provide, to requesting communication devices, current presence information respecting selected enterprise subscribers.

As used herein, a "subscriber" refers to a person who is serviced by, registered or subscribed with, or otherwise affiliated with an enterprise network, and "presence information" refers to any information associated with a network node and/or endpoint device, such as a communication device, that is in turn associated with a person or identity. Examples of presence information include registration information, information regarding the accessibility of the endpoint device, the endpoint's telephone number or address (in the case of telephony devices), the endpoint's network identifier or address, the recency of use of the endpoint device by the person, recency of authentication by the person to a network component, the geographic location of the endpoint device, the type of media, format language, session and communications capabilities of the currently available communications devices, the preferences of the person (e.g., contact mode preferences or profiles such as the communication device to be contacted for specific types of contacts or under specified factual scenarios, contact time preferences, impermissible contact types and/or subjects such as subjects about which the person does not wish to be contacted, and permissible contact type and/or subjects such as subjects about which the person does wish to be contacted. Presence information can be user configurable, i.e., the user can configure the number and type of communications and message devices with which they can be accessed and to define different profiles that define the communications and messaging options presented to incoming contactors in specified factual situations. By identifying predefined facts, the system can retrieve and follow the appropriate profile.

The WAN(s) can be any distributed network, such as packet-switched or circuit-switched networks, to name a few. In one configuration, the WANs 108 include a circuit-switched network, such as the Public Switch Telephone Network or PSTN, and a packet-switched network, such as the Internet. In another configuration, WAN 108 includes only one or more packet-switched networks, such as the Internet.

The gateways 124 can be any suitable device for controlling ingress to and egress from the corresponding LAN. The gateways are positioned logically between the other components in the corresponding enterprises and the WAN 108 to process communications passing between the appropriate switch/server and the second network. The gateway 124 typically includes an electronic repeater functionality that intercepts and steers electrical signals from the WAN to the corresponding LAN and vice versa and provides code and protocol conversion. Additionally, the gateway can perform various security functions, such as network address translation, and set up and use secure tunnels to provide virtual private network capabilities. In some protocols, the gateway bridges conferences to other networks, communications protocols, and multimedia formats.

In one configuration, the communication devices 120, 148, and 150 can be packet-switched stations or communication devices, such as IP hardphones, IP softphones, Personal Digital Assistants or PDAs, Personal Computers or PCs, laptops, packet-based video phones and conferencing units, packet-based voice messaging and response units, peer-to-peer based communication devices, and packet-based traditional computer telephony adjuncts.

In some configurations, at least some of communications devices 120, 148, and 150 can be circuit-switched and/or time-division multiplexing (TDM) devices. As will be appreciated, these circuit-switched communications devices are normally plugged into a Tip ring interface that causes electronic signals from the circuit-switched communications devices to be placed onto a TDM bus (not shown). Each of the circuit-switched communications devices corresponds to one of a set of internal (Direct-Inward-Dial) extensions on its controlling switch/server. The controlling switch/server can direct incoming contacts to and receive outgoing contacts from these extensions in a conventional manner. The circuit-switched communications devices can include, for example, wired and wireless telephones, PDAs, video phones and conferencing units, voice messaging and response units, and traditional computer telephony adjuncts. Although not shown, the first enterprise network 112 can also include circuit-switched or TDM communication devices, depending on the application.

Although the communication devices 120, 148, and 150 are shown in FIG. 1 as being internal to the enterprises 112 and 116, these enterprises can further be in communication with external communication devices of subscribers and nonsubscribers. An "external" communication device is not controlled by an enterprise switch/server (e.g., does not have an extension serviced by the switch/server) while an "internal" device is controlled by an enterprise switch/server.

The communication devices in the first and second enterprise networks 112 and 116 can natively support streaming IP media to two or more consumers of the stream. The devices can be locally controlled in the device (e.g., point-to-point) or by the gateway 124 or remotely controlled by the communication controller 162 in the switch/server 152. When the communication devices are locally controlled, the local communication controller should support receiving instructions from other communication controllers specifying that the media stream should be sent to a specific address for archival. If no other communication controller is involved, the local communication controller should support sending the media stream to an archival address.

The archival server 128 maintains and accesses the various associated databases. This functionality and the contents of the various databases are discussed in more detail below.

The messaging server 142, email server 144, and instant messaging server 146 are application servers providing specific services to enterprise subscribers. As will be appreciated, the messaging server 142 maintains voicemail data structures for each subscriber, permitting the subscriber to receive voice messages from contactors; the email server 144 provides electronic mail functionality to subscribers; and the instant messaging server 146 provides instant messaging functionality to subscribers.

The switch/server 152 directs communications, such as incoming Voice over IP or VoIP and telephone calls, in the enterprise network. The terms "switch", "server", and "switch and/or server" as used herein should be understood to include a PBX, an ACD, an enterprise switch, an enterprise server, or other type of telecommunications system switch or server, as well as other types of processor-based communication control devices such as media servers, computers, adjuncts, etc. The switch/media server can be any architecture for directing contacts to one or more communication devices.

The switch/server 152 can be a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. Exemplary control programs include a communication controller 162 to direct, control, and configure incoming and outgoing contacts, a conference controller 164 to set up and configure multi-party conference calls, and an aggregation entity 166 to provide to the archival server 128 plural media streams from multiple endpoints involved in a common session. The switch/server can include a network interface card to provide services to the associated internal enterprise communication devices.

The switch/server 152 can be connected via a group of trunks (not shown) (which may be for example Primary Rate Interface, Basic Rate Interface, Internet Protocol, H.323 and SIP trunks) to the WAN 108 and via link(s) 156 and 158, respectively, to communications devices 148 and communications devices 150, respectively.

Other servers 154 can include a variety of servers, depending on the application. For example, other servers 154 can include proxy servers that perform name resolution under the Session Initiation Protocol or SIP or the H.323 protocol, a domain name server that acts as a Domain Naming System or DNS resolver, a TFTP server 334 that effects file transfers, such as executable images and configuration information, to routers, switches, communication devices, and other components, a fax server, ENUM server for resolving address resolution, and mobility server handling network handover, and multi-network domain handling.

The systems and methods of the present disclosure do not require any particular type of information transport medium or protocol between switch/server and stations and/or between the first and second switches/servers. That is, the systems and methods described herein can be implemented with any desired type of transport medium as well as combinations of different types of transport media.

Although the present disclosure may be described at times with reference to a client-server architecture, it is to be understood that the present disclosure also applies to other network architectures. For example, the present disclosure applies to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Moreover, the present disclosure does not require a specific Internet Protocol Telephony (IPT) protocol. Additionally, the principles disclosed herein do not require the presence of packet- or circuit-switched networks.

In system 100, the archival server 128 can include a number of computational components. For example, as shown in FIG. 1, these components can include the key generation, storage, and retrieval agent 170, user authentication agent 172, archival tagging module 174, media archival module 172, and archival retrieval module 178.

The key generation, storage, and retrieval agent 170 generates keys for storing selected information in encrypted form. The keys are normally pointers to the stored content and are stored in the key database 130 and are organized to form indices to the stored archives. The keys are preferably unique. Although the keys are shown as being generated by the archival server 128, they could also be generated by the communication controller 162.

The user authentication agent 172, using subscriber profiles in the security and access control database 132, authenticates subscribers and, if successfully authenticated, determines what stored information (e.g., tags, metadata, and archives) the subscriber is authorized to have access to. Authorization can be done by any suitable technique, including username, personal identification number, digital certificate, symmetric keys, asymmetric keys, and the like.

The media archival module 176 stores activity-related or archival information or data in the archival database 138. Such information or data includes all or selected portions of communications, and all or selected portions of documents. In one implementation, voice streams (and video streams) are stored, archived, tagged, and available for future retrieval. The module 176 receives media streams for media events and stores these media stream. In some configurations, the media streams can be received in encrypted form or ciphertext. The media streams can be stored using mass storage technology. For example, mass storage technologies such as digital video recorder (DVR) or video on demand (VOD) technologies. The media stream can be indexed in the archival database 138 using the keys in the key database 130. The media can then be stored in an encrypted or unencrypted form.

The archives can be stored in the archival database 138 in any number of formats, including proprietary and non-proprietary formants, and using any means for compressing or storing media for digital storage or communication. For example, the archives can be stored using an MPEG format (or any variants thereof) or Microsoft Corporation's Windows™ media file format. The archival database 138 can alternatively be a flat file/directory structure with an index scheme (e.g., an index file or directory structure based on subscriber identifier (e.g., electronic address), date stamp, time stamp, or unique identifier specified at the time of recording by the subscriber or another entity).

The archival tagging module 174 receives data tags and the unique archival key and creates search and relevance tags for the archived information. As used herein, tags are a type of metadata that is descriptive of the archived information. As will be appreciated, "metadata" is data that describes data objects. Tags typically are a code or set of characters inserted into a file or data structure indicating how the corresponding stored information is to be interpreted. The tags can be the form of eXtensible MarkUp Language (XML) or some other markup language. The tagging module 174 allows for configuration of user permissions to the databases or to specific subsets of archives and associated metadata, allows users to retrieve and view specific metadata elements that are non-modifiable, such as date stamp, a time stamp, recording length, etc.; allows users to enter a specific set of comma-delimited tags that become part of the metadata associated with a particular archive index entry, allows users to retrieve, view and update specific data elements that are modifiable (e.g., the tags previously entered), and maintains an index of tags, also referred to as a tag cloud (discussed below), that represents the unique subset of all tags specified by a user or group of users against any number of archive files.

Data tags include metadata descriptive of an activity, such as related to party (e.g., identities (name and/or electronic address) of parties to the communication, etc.), time (e.g., a date stamp and/or time stamp associated with a communication, a duration of the communication, etc.), form of recording of the activity (e.g., format of the recording, identifier associated with the recording (e.g., a unique identifier provided by the subscriber), etc.), and activity context (e.g., a reason for the communication, topics discussed (e.g., the keywords identified by the user agent 160), activities of each party prior and/or subsequent to and/or during the conversation (e.g., as determined by the user agent 160 by monitoring the computational operations of its corresponding communication device), and threading (whether the recorded activity was related to a previous activity)). The data tags may be obtained from other computational components, from the text of the communication, and/or from the subscriber(s). When received from the subscriber, the tags are a type of meta-tag.

Search and relevance tags can be generated from the metadata. The archival tagging module 174 normally includes an engine that refines and filters the data tags to produce the search and relevance tags. Factors used in search and relevance tag generation include a selected set of enterprise tags (e.g., tags selected by enterprise management), type of communication, context of communication, time stamp of communication, the level of order relationship (e.g., use first, second, . . . $n^{th}$ order relationships to describe the degree of relevance of tags), frequency of topic, breadth of communication on the topic, and recency of topical communication. Enterprise tags are tags mandated by enterprise management to provide coherence to the search engine. For example, data tags are mapped to the enterprise tags to avoid multiple tags referring to the same topic. This enhances topical search accuracy as the search terms for a given topic are standard. The system will automatically build more enterprise tags for itself as users enter topics in their queries for information not already embodied by an enterprise tag. In this case, the system will create a new enterprise tag based on the topic of the query, build $n^{th}$ order relationships between the topics if multiple topics were entered, and create quickly scannable indexes for the topic (s) for future update and scanning. In one configuration, the user agent 160 provides, from a topical search window, to the subscriber a list of search and relevance tags from which the subscriber may select one or more search terms to be used. Search and relevance tags are stored in the tag database 134 while other metadata, such as data tags and/or date/time stamp data, are stored in a metadata database 136.

Tags can be any keyword or set of keywords, and data tags can be captured as written text or as spoken words translated to written text using an analog-to-digital converter and Speech-To-Text (STT) conversion. Additionally, some data tags (e.g., such as date/time stamp and participant identifiers) may be automatically captured as tags. As noted, the system can present the subscriber with a list of pre-existing or pre-determined (e.g., enterprise) tags, from which the subscriber can select one or more tag. For subscriber selected or inputted data tags, the subscriber needs to have access to either a device capable of capturing voice (e.g., a microphone), a keyboard, a mouse, or other human interface device, linked to an interface capable of capturing his or her data tag selection(s). The interface, for example, can be a speech recording/recognition engine, a Web browser, and other software application. The data tags are then transported to the archival server substantially simultaneously with the media. In one variation, the system collects a group of data tags and transmits the group of data tags periodically or when a threshold quantity of data tags are collected.

In some configurations, tags can be associated with other content related with the media event. That is, a user interface at communications devices 120, 148, or 150 can be configured to provide capabilities for the subscriber to enter tags and any other information during display of the online content or display of the media event. For example, a subscriber could enter information specifying the location of other content associated with the media event. Such an interface can be provided via an HTML web-page being opened by the archival tagging module 174 via the Hyper-Text Transfer Protocol (HTTP) via a locally executed HTML browser. However, the present disclosure contemplates providing other types of interfaces for subscribers to input tags and other information. Thereafter, a user interface at one of communications devices 120, 148, or 150 can be configured to allow the subscriber to access, during viewing of an online content or during a media event, the additional content by selection of an associated tag.

In some configurations, the application that is responsible for interacting with the subscriber during the conversation itself (e.g., to start/control/stop recording and digitizing) prompts the subscriber via the subscriber's communication link to speak a set of data tags and runs the spoken data tags through a speech recognition engine, passing the resulting translated data tags to the metadata database 136 along with other metadata values. This can require incorporating the prompt-upon-call-recording-termination activities into the call recording application and integrating a speech-to-text function into one of two places. The call recording application can parse and translate the data tags, passing them as additional items of metadata to the archival tagging module 174. Alternatively, the call recording application can pass a digitized set of spoken data tags to the tagging module 174 and allow the tagging module 174 to process that stream of audio into keywords and translate them to text, storing them as part of the associated metadata.

The archival retrieval module 178 receives search queries from subscribers for stored information, which may be archives, metadata, search and relevance tags, or fluent persons in a selected topic, performs the search in the corresponding database, and returns the located information to the requesting communication device for presentation to the subscriber. In other words, the module 178 presents users with a list of metadata fields upon which the index can be searched, presents users with the tag cloud (e.g., the collection of all possible unique tags for which that user has permissions), allows the user to specify metadata values or select one or more tags from the user's tag cloud and retrieve from the index a list of all archives whose metadata or tag elements match those specified by the user, allows the user to identify one or more specific archives that he or she wishes to retrieve from a repository, and retrieves the specified archives for transmission/playback to the user. For example, the module 178 can receive a search query and, in response, generate, based on the relevance of the tags associated with archived media, a list of potential archived media satisfying the query in question. The retrieved archived media could be played back as a telephone call or displayed as a file sent to the subscriber, based on preferences and permissions that are enforced on the archival retrieval module 178. The search mechanism can be Web-based, voice-based, text-based, or by some other means.

In a simple configuration, one party in the conversation controls the start-stop of the recording. Depending upon the implementation, the archival tagging module 174 and the archiving retrieval module 178 can have user-based permissions and individualized (user-based) indices into archives that will allow one or more parties to tag a specific archive according to unique and individualized data tags. In other words, the archived media will have two different sets of data tags corresponding to the different subscribers. Either subscriber may later retrieve that archive based on the data tags specified in the metadata fields, either based on individualized or shared (enterprise) tags.

As will be appreciated, multiple media archival servers in a given enterprise can handle media processing and storage. The various databases 130, 132, 134, 136, 138, and 140 may have their data configured according to a relational database architecture, an object oriented database architecture, or configured for access by another type of database architecture. Additionally, the data repository or storage may be simply a collection of one or more data files, wherein the data therein may be ordered or unordered.

Figure 2:
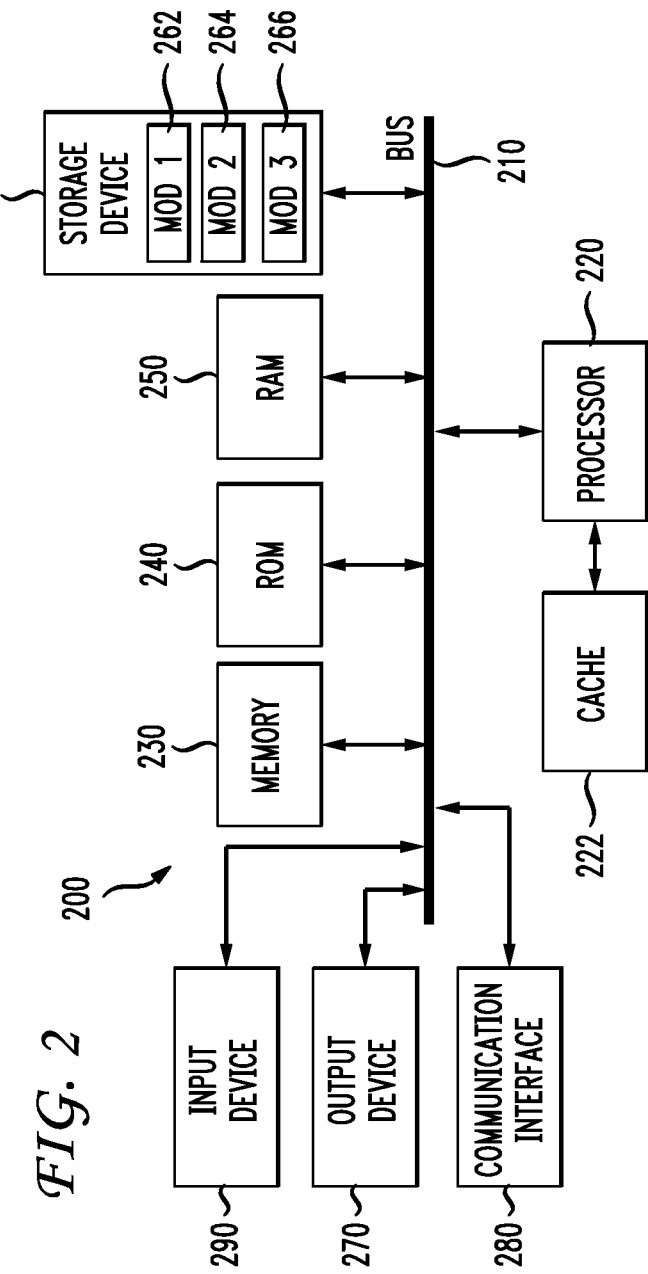
FIG. 2 illustrates a general-purpose computing device for implementing any of the components in FIG. 1.

With reference to FIG. 2, a general-purpose computing device 200 is provided for implementing any of the components in FIG. 1. Although a particular architecture is illustrated for computing device 200, this is for illustrative purposes only. The present disclosure contemplates using one or more computing devices having more or less components than shown in FIG. 2.

As shown in FIG. 2, the computing device 200 includes a processing unit (CPU or processor) 220 and a system bus 210 that couples various system components including the system memory 230 such as read only memory (ROM) 240 and random access memory (RAM) 250 to the processor 220. The system 200 can include a cache 222 of high speed memory connected directly with, in close proximity to, or integrated as part of the processor 220. The system 200 copies data from the memory 230 and/or the storage device 260 to the cache for quick access by the processor 220. In this way, the cache 222 provides a performance boost that avoids processor 220 delays while waiting for data. These and other modules can be configured to control the processor 220 to perform various actions.

Other system memory 230 may be available for use as well. The memory 230 can include multiple different types of memory with different performance characteristics. It can be appreciated that the disclosure may operate on a computing device 200 with more than one processor 220 or on a group or cluster of computing devices networked together to provide greater processing capability. The processor 220 can include any general purpose processor and a hardware module or software module, such as module 1 262, module 2 264, and module 3 266 stored in storage device 260, configured to control the processor 220.

The present disclosure also contemplates processor 220 being implemented as a special-purpose processor where software instructions are incorporated into the actual processor design. Further, the processor 220 can be a completely self-contained computing system, containing multiple cores or processors, a bus, memory controller, cache, etc. Additionally, processor 220 can be a multi-core processor, including symmetric or asymmetric multi-core processor designs.

The system bus 210 may be any of several types of bus structures including a memory bus or memory controller, a peripheral bus, and a local bus using any of a variety of bus architectures. A basic input/output (BIOS) stored in ROM 240 or the like, can provide the basic routine that helps to transfer information between elements within the computing device 200, such as during start-up. The computing device 200 further includes storage devices 260 such as a hard disk drive, a magnetic disk drive, an optical disk drive, tape drive or the like. The storage device 260 can include software modules 262, 264, 266 for controlling the processor 220. Other hardware or software modules are contemplated. The storage device 260 is connected to the system bus 210 by a drive interface. The drives and the associated computer readable storage media provide nonvolatile storage of computer readable instructions, data structures, program modules and other data for the computing device 200. In one aspect, a hardware module that performs a particular function includes the software component stored in a computer-readable medium in connection with the necessary hardware components, such as the processor 220, bus 210, display 270, and so forth, to carry out the function. The basic components are known to those of skill in the art and appropriate variations are contemplated depending on the type of device, such as whether the device 200 is a small, handheld computing device, a desktop computer, or a computer server.

Although the exemplary embodiment described herein employs the hard disk 260, it should be appreciated by those skilled in the art that other types of computer readable media which can store data that are accessible by a computer, such as magnetic cassettes, flash memory cards, digital versatile disks, cartridges, random access memories (RAM) 250, read only memory (ROM) 240, a cable or wireless signal containing a bit stream and the like, may also be used in the exemplary operating environment. Computer-readable storage media expressly exclude non-tangible media for carrying energy, carrier signals, electromagnetic waves, and signals per se.

To enable user interaction with the computing device 200, an input device 290 represents any number of input mechanisms, such as a microphone for speech, a touch-sensitive screen for gesture or graphical input, keyboard, mouse, motion input, speech and so forth. An output device 270 can also be one or more of a number of output mechanisms known to those of skill in the art. In some instances, multimodal systems enable a user to provide multiple types of input to communicate with the computing device 200. The communications interface 280 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 220. The functions these blocks represent may be provided through the use of either shared or dedicated hardware, including, but not limited to, hardware capable of executing software and hardware, such as a processor 220, that is purpose-built to operate as an equivalent to software executing on a general purpose processor. For example the functions of one or more processors presented in FIG. 2 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 240 for storing software performing the operations discussed below, and random access memory (RAM) 250 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 200 shown in FIG. 2 can practice all or part of the recited methods, can be a part of the recited systems, and/or can operate according to instructions in the recited non-transitory computer-readable storage media. Such logical operations can be implemented as modules configured to control the processor 220 to perform particular functions according to the programming of the module. For example, FIG. 2 illustrates three modules Mod1 262, Mod2 264 and Mod3 266, which are modules configured to control the processor 220. These modules may be stored on the storage device 260 and loaded into RAM 250 or memory 230 at runtime or may be stored as would be known in the art in other computer-readable memory locations.

Having disclosed some basic system components, the disclosure now turns to the exemplary method embodiment shown in FIG. 3. For the sake of clarity, the method is discussed in terms of an exemplary system such as is shown in FIGS. 1 and 2 configured to practice the method.

FIG. 3 is a flowchart of steps in an exemplary method 300 for communicating tags associated with an online content or a media event to users using multiple media types. Method 300 begins at step 302 and continues on to step 304. At step 304, a first or default communication of tags for the media event can be retrieved. That is, data representing a preferred or default method for presenting the tags at a communications device can be retrieved. For example, the archival retrieval module 178 can be configured to generate the default tag communication for a media event based on tag information stored in the tag database 136 for the media event and other information.

The present disclosure contemplates that this default tag communication can occur in a variety of ways. In some implementations, the default tag communication can be configured as stream of data continuously being delivered to a communications device. In such implementations, the presentation of the tags can be continually updated at the communications device. However, the present disclosure also contemplates that the default tag communication can take the form of data delivered in a non-continuous manner. That is, data representing the tags is delivered to the communications device only when the display of the tags at the communications device needs to be updated or otherwise altered. Further, the present disclosure contemplates that the tag communication can take the form of a single, one-time communication of the data representing the tags. For example, the system can manifest the single, one-time communication of the data as an image or other visual representation of a tag cloud.

The present disclosure also contemplates that a tag communication can be configured to convey tag information in a variety of ways. That is, a tag communication can be configured to present an evolution of tags, an identification of tags most recently added, or an identification of tags that are currently more significant, to name a few. Additionally, a tag communication can be configured to show other aspects of the tags or any combinations thereof. Further all or a subset of the tags for the media event can be presented in a tag communication. For example, a tag communication can present data for an entire tag cloud or only tags relevant to a portion of the media event currently being accessed.

Once the default tag communication is retrieved at step 304, the method 300 can proceed to step 306. At step 306, the portion of the communications devices accessing the media event, but that are incompatible with the media format of the default tag communication can be identified. In particular, the types and/or capabilities of the communications devices can be determined to identify which devices are incompatible. Such identification can be accomplished in a variety of ways.

In some configurations, the incompatibility can be determined based on the type of device and/or connection being used by the communications device. Thus, if the type of device or the type of connection is not suitable for the media format of the default tag communication, the connected communications device is identified as incompatible. For example, with respect to FIG. 1, if gateway 124 is a telephony device gateway and communications devices 120 are telephony devices connected thereto, the archival server 128 can be configured to either detect that devices 120 are telephony devices or that the gateway 124 is a telephony gateway. Accordingly, archival server 128 can be configured or include logic for concluding that devices 120 are telephony devices that support only audible communications and that these devices will be incompatible with a tag communication that presents information visually.

In other configurations, the system can determine the incompatibility based on the user authentication process. That is, as users are authenticated, the authentication procedure utilized can be associated with a particular type of device. For example, users accessing a media event via a website will likely be associated with a different user interaction as compared to users accessing a media event via a telephone. Accordingly, the procedure or interaction used to connect a user can be user to then identify the type of communications device being used and determine that an incompatibility exists. For example, the interactions between user authentication agent 172 and any of devices 120, 148, and 150 can be used to identify a type of each of these devices. Based on this device type information, archival server 128 can then determine which of these devices will be incompatible with the default tag communication.

In still another configuration, the system can determine incompatibility based on direct input from the users at the communications devices. For example, at the beginning of the media event, the user can be prompted to provide information regarding the type of communications device being used or the type of connection being used. Further, a user can connect via an audio-enabled device, but desire a text-only connection. The user can indicate a subset of communication capabilities to use for a particular scenario. The system can determine incompatibility based on the indicated subset of capabilities instead of the full capabilities of the communications device. The system can perform identification during the user authentication process or during other processes. Based on this device type information, archival server 128 can then determine which of these devices will be incompatible with the default tag communication.

The present disclosure also contemplates that any other number of methods can be used to identify which of communications devices 120, 148, and 150 will be incompatible with the default tag communication. Further, the present disclosure also contemplates that to increase the accuracy of the identification a combination of methods can be used. Alternatively, the identification can occur at different times, as the capabilities of the communications device can vary over time. For example, if a network connection quality between one of communications devices 120, 148, and 150 varies over time, the type of supportable tag communications can vary. Thus, although a network connection may initially support delivery of the default tag communication, at later times the network connection may not support delivery of the default tag communication, or vice versa. Accordingly, the present disclosure contemplates adjusting the tag communications to account for variations in the compatibility/incompatibility of communications devices due to communications link quality.

After the identification process at step 306 is completed, second or alternate tag communications for the identified devices can be generated at step 308. That is, the tags from the default tag communication can be used to generate one or more alternate tag communications that are compatible with the devices identified at step 306. Specifically, the alternate tag communications are configured to convey the information from the default tag communication using a media type that can presented at the identified devices. For example, in the case of a default tag communication conveying tag information visually and the media event being accessed by users via telephones, mobile phone, or other audio-only communications links, an alternate tag communication can be generated that audibly conveys at least part of the tag information from the default tag communication.

This conversion process can occur in a variety of ways. For example, as shown in FIG. 1, the archival server 128 can include a translation/conversion T/C module 180 for managing such tasks. In operation, the archival server 128 can be configured to cause that the ones of communications devices 120, 148, and 150 identified as being incompatible with the default tag communication, receive an alternate tag communication generated by tag communication T/C module 180 instead of the default tag communication generated by archival retrieval module 178. Alternatively, the archival retrieval module 178 can be configured to access on T/C module 180 to generate tag communications for any of communications devices 120, 148, and 150 identified as being incompatible with the default tag communication. Thereafter, the T/C module 180 generates the alternate tag communications for the identified ones of communications devices 120, 148, and 150. In either case, the contents of the alternate tag communication can depend on the type/compatibility of the identified devices and other considerations, as described below.

The present disclosure contemplates that the alternate tag communication can be configured to present tag information from the default tag communication in its entirety, partially, or in a summarized form, depending on the types of and numbers of tags in the default tag communication. For example, in the case of a default tag communication conveying tag information visually and the media event being accessed by user via a telephone, mobile phone, or other audio-only communications link, tags can be presented in an audible form. If the default tag communication contains a limited number of tags, the tags represent words, and the tags occur at relatively separate times, the system can present all the tags. However, if the tags are associated with visual effects or include non-word tags, it can be difficult to present some of these tags in an audible form. Accordingly, the system can exclude these tags from the alternate tag communication. Further, if a large number of tags are associated with a relatively short time, presenting all of the tags can result in an unusable tag communication. For example, in the case of an audible media stream, providing multiple, overlapping audible tags can result in an unintelligible tag communication. Thus, the tags can be limited to those that are more important or relevant. Alternatively, the system can replace the entire group of potentially overlapping tags with one or more summary tags that summarize one or more common element in the tags. For example, a set of tags from a default tag communication can be distilled to a common theme or sentiment so that only a single tag is needed in the alternate tag communication.

The present disclosure also contemplates utilizing a bag-of-words approach to generating tags for an alternate tag communications. That is, the tags for the alternate tag communications are selected from a finite list of pre-defined tags. Such a selection can be based on calculating proximity of a tag in the default tag communications to each of the pre-defined tags. However, the present disclosure contemplates utilizing other methods for selecting from pre-defined tags.

After an alternate tag communication is generated at step 308, the alternate tag communication can be delivered to the identified communications devices at step 310. That is, the alternate tag communication generated by T/C module 180 can be delivered directly or indirectly (via archival retrieval module 178) to the identified ones of communications devices 120, 148, and 150.

The present disclosure contemplates that delivery of the alternate tag communication can occur at the same time as the delivery of the media stream associated with the media event. That is, the alternate tag communication can be configured to coincide with the delivery of the default tag configuration. Thus, users participating in events with live tagging can receive tag information in real-time during the event. The present disclosure also contemplates that delivery of the alternate tag communication need not occur concurrently or contemporaneously with delivery of the media stream for the media event. That is, the tag information can be reviewed separately for the media event.

Optionally, method 300 can also include updating of the default tag communication based on instructions from the communications devices in step 306 and repeating steps 304-310. This update process is described in greater detail below with respect to FIG. 4. If no updating is to be performed, the method 300 can end at step 314 and resume previous processing, including repeating method 300.

An important aspect of a collaborative media event is the ability to provide feedback or otherwise exchange information. In the same manner that users may be limited with respect to receiving tag information, it is also possible that users will be limited with respect to providing tag information. For example, in the case of participants accessing a media event via a telephony connection, the communications device being used will typically not have access to an interface for submitting tag information. Accordingly, the present disclosure also contemplates providing the ability to submit tag information using such communications devices. This is described below with respect to FIG. 4.

FIG. 4 is a flowchart of steps in an exemplary method 400 for updating tags for a media event based on tag instructions received using multiple media types. For example, method 400 can be implemented at step 312 in FIG. 3. Method 400 begins at step 402 and continues to step 404. At step 404, tag instructions are received from the communications devices receiving alternate tag communications, such as the identified devices in FIG. 3. In particular, these tag instructions may be received in the media format of the alternate tag communications.

For example, in the case of voice-only communications devices, a method for adding tags via an audio channel can be through a voice recognition system, or a system that utilizes a phone DMTF or button to designate the incoming audio is to be sent to the tagging service. For example, as described above, an archival tagging module can be configured for such tagging tasks. The tagging service itself can be a sequenced application that is bridged into a call, just as a recording system may be bridged into a call. In this respect, the audio tagging capability disclosed herein can be added to a media event via steps that are similar in function to adding a person to a conference call via a bridge. The tagging service is simply bridged to the call and can identify who is only communicating via a voice connection, identify what the capability of the user device is, and implement the service accordingly.

Additionally, users can enter the tags as text, select tags from a menu, utter an audio tag which is processed by automatic speech recognition (ASR) to generate a text tag, and so forth. If the user is on a phone with a texting capability, the "whisper" could be converted to text or sent as text to the device. The system in this respect can have an operable connection and linkage to a phone user interface for enhancing the tagging experience. In this respect, although the user may be on a phone call in a conference, and speaking audio tags ("he's going to choke"), the archival tagging module 174 or other portion of server 128 can have a link into the user interface such that tag information is not only capable of being "whispered" but other text or graphical information can be displayed on the interface, such as a tag cloud for the event. Furthermore, when a participant provides such an audio tag, these tags can be delivered to all other participants or kept at least partially private (i.e., not delivered to one or more of the other participants). In one aspect, the system sends a notification of the private tag and/or metadata describing the private tag, but not the contents of the tag, to the one or more other participants to whom the private tags are not delivered.

Referring back to FIG. 4, once the new tags are generated at step 406, the default tag communication can be updated at step 408. The method can then end at step 410 and resume previous processing, including repeating method 300 or method 400.

Although the methods described with respect to FIGS. 3 and 4 are directed to providing alternate tag communications due to device incompatibility, the present disclosure also contemplates using such alternate tag communications as a means of providing additional information to participants during a media event. That is, such alternate tag communications can also be useful as a secondary communications channel in a collaborative environment. For example, such alternate tag communications can enable presenters to get instant feedback from their audience, whether the audience is tagging in the same room or distributed around the world. Thus, during a conference call or other media event, a moderator can use an alternate tag communication to allow anonymous voting through tags in an augmented audio space. For example, the moderator can ask participants on the conference call "do you approve of the new budget and why or why not?" The participants can tag the conference call "Yes" or "No, we spend too much on marketing". The moderator can then receive the majority response via an alternate tag communication. For example, an audio channel can be generated that states the results of voting. In some configurations, such an alternate tag communication can be received by the moderator alone and/or by one or more portions of the participants of the media event. Access to such an alternate tag communication can be limited by the authentication credentials of the participants. Such a configuration can also be useful for broadcasters to understand what the audience likes and dislikes as well as reasons why. A method for providing such interactions is illustrated with respect to FIG. 5.

The system can further include an analytics module in which a user can drill down, explore, and compare different segments of tags. For example, the user can compare tags on a conference call by state, by employer, or by time. More granular information can provide feedback that is more detailed than a simple majority result of tags.

FIG. 5 is a flowchart of steps in an exemplary method 500 for providing interaction between participants of a media event via an alternate tag communications. Method 500 begins at step 502 and continues to step 504. At step 504, tags are received from communications devices during a media event, as described above with respect to FIG. 1 and/or FIG. 4.

In general, the tag information received at step 504 can include information for various types of tags. However, the present disclosure contemplates that at least some of the tag information received from multiple users will be associated with a specific event, prompt, or stimulus during the media event. For example, tag information can be received as a response to a prompt from a moderator, as described above. In another example, users can be trained or educated to provide a response upon the occurrence of other specific events or stimuli. In one embodiment, the media event is a live or recorded classroom lecture. Students or lecture attendees can tag portions of the lecture as they view the live or recorded lecture. For example, if the teacher indicates that a particular concept or question will be on the final exam, then some or all of the students can tag that portion with a "final exam" tag. If the teacher tells a funny joke or an amusing anecdote, some or all of the students can tag that portion with a "funny" tag. The summary tags described above can include a combination of multiple tags generated by users based on their personal perspectives of the media event. Thus, the use of prompts to elicit tags from users is entirely optional. The present disclosure also contemplates that the events or stimuli that prompt users to provide a response can be provided in several ways. For example, the event, stimulus, or prompt can be provided as part of the media event itself. Alternatively, the event, stimulus, or prompt can be provided using tags. For example, another alternate tag communication can initially be generated to prompt users to provide a response.

Regardless of how the users are prompted, once the tag information is received at step 504, the tag information for the alternate tag communication (i.e., tag information in response to the prompt) is identified at step 506. Such identification can be provided in several ways. For example, a user interface can be configured to allow users to associate tag information with particular prompts. That is, the tag information can include an identifier or other information that associates the tag information with a prompt. In another example, a tagging system can be configured to associate any tag information received within a fixed time period following to prompt as tag information for the alternate tag communication. Additionally, a combination of methods can be used. Such a configuration allows users using communication devices with limited user interfaces to provide tag information along with users having access to other communications devices. The present disclosure also contemplates the use of any other methods for associating tag information with specific events, stimuli, or prompts.

Once the tag information for the alternate tag communication is identified at step 506, this tag information can then be used to generate the alternate tag communication at step 508. Thereafter, the alternate tag communication can be delivered to at least a portion of the communications devices at step 510. After the alternate tag communication is delivered at step 510, the method can end at step 512 and resume previous processing, including repeating of method 500.

The present disclosure contemplates that it may not be necessary to deliver the alternate tag communication generated at step 508 to all users. That is, in some instances the entity monitoring the tag information or generating the prompts for users may wish to limit access to the alternate tag communication generated at step 508. Accordingly, only a selected group of communications devices would receive the alternate tag communication can be limited at step 510. Such selective delivery of the alternate tag communication can be performed in a variety of ways. For example, communications devices can be selected based on authentication information provided the user authentication agent 172. Alternatively, communications devices can be selected based on device characteristics or communications link. That is, the resulting alternate tag communication may only be suitable for certain devices or certain communications link types. For example, results can be limited to users having access to a display or having a broadband connection.

The present disclosure also contemplates that the alternate tag communication can be delivered to the selected communications devices in addition to or in place of other tag communications. For example, a moderator for a conference can receive a tag cloud via a first tag communication and receive the results of a vote using a second tag communication. Further, in configurations where such multiple tag communications are being received, the tag communications can be of the same or different media types. For example, participants in a conference can receive a first tag communication configured to display a tag cloud visually. The participants can then receive a second tag communications of a vote result visually or audibly. Other configurations are possible.

As described in some of the exemplary configurations above, the present disclosure contemplates a tagging system that processes at least a portion of a default tag communication to generate an alternate tag communication that presents the tags audibly to the users in an augmented audio space. The augmented audio space can be merged as part of the audio feed of the media event or can be a separate audio channel, such as a radio channel, telephone call, or a transmission to a headset. Thus, for example, as the user watches a basketball game, the tagging system can be configured to provide a "whisper" or other audio at a low volume, representing the processed tags along with the information about the tags such as the author(s) of the tag, frequency of tag etc. For example, during a basketball game, a summary of the tagging activity associated with a player with a low success rate at the foul line can indicate that most tags comment that he will not make the foul shot and will "choke." The "whisper" can be audibly presented as "he is going to choke" or the like. In some configurations, the augmented audio space can be overlaid on top of or integrated as part of the audio channel of the media event.

Although the example above sets forth an example of a low volume "whisper", the present disclosure contemplates that the augmented audio space can be quieter or louder than the audio from the media event. The system can adjust the level of the audio, pitch, and other features to account for various features or characteristics of the tagging. For example, the higher the use of a tag or related tags, the louder the volume of the tags in the alternate tag communication. Furthermore, the amount of audio information that is presented can be dependent on the media event and what is currently occurring. For example, if there is a large amount of tagging at any particular time, and there is a lull (e.g. such as a time-out when the player is at the foul line), this could trigger more audio tagging data being presented. Along with "whispered" tags, other information can be provided such as who provided the tag, frequency, how many tags the "whisper" represents (e.g., "80 percent of tags think he is going to choke"), or any other meta data associated with the "whispered" tag. The amount of such data presented can be dependent on how much audio bandwidth is available before audio of the media event resumes. In one embodiment participants in a live event, such as players in a sporting event, can receive tags in substantially real time from the audience of the event, such as via a wireless earpiece. In the case of a sporting event, however, the players may not have the ability to respond to tags.

In one aspect, each user device displays a personalized view of the tags. The type and amount of tags in the personalized view can be based on the device, the communication modality, user permissions, user access limitations, a user history, a user profile, and/or other factors. In this way, different user devices each have a different, potentially unique, display output based on a different subset of the tags.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc., that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
obtaining, via a processor, a first tag communication, the first tag communication being of a first type and comprising a first plurality of tags associated with a media event being of a second type and presented at a plurality of communications devices, wherein each tag in the first plurality of tags comprises a user-generated content item corresponding to a specific time index of the media event after the media event begins being presented;
identifying a communications device of the plurality of communications devices that is incompatible with the first type to yield an identified communications device, wherein the identified communications device is incompatible with the first type when the identified communications device is absent an ability to at least one of receive or process communications being of the first type;
generating a second tag communication of the second type that is compatible with the identified communications device, the second tag communication comprising a second plurality of tags based on the first plurality of tags, wherein (i) the first type is text and the second type is audio, or (ii) the first type is audio and the second type is text; and
delivering the second tag communication to the identified communications device.

2. The method of claim 1, wherein generating the second tag communication of the second type further comprises selecting each of the second plurality of tags to comprise a content of at least one of the first plurality of tags.

3. The method of claim 1, wherein generating the second tag communication of the second type further comprises:
determining device permissions for the identified communications device; and
assembling the second tag communication for the identified communications device based on the device permissions.

4. The method of claim 3, wherein assembling the second tag communication comprises constructing the second plurality of tags based on a subset of the first plurality of tags, wherein the subset is selected based on user permissions.

5. The method of claim 1, wherein the identified communications device lacks audio capability.

6. The method of claim 1, further comprising:
receiving tag instructions from the identified communications device in the second type;
assembling an updated first tag communication based on the tag instructions; and generating the second tag communication and delivering the second tag communication based on the updated first tag communication.

7. The method of claim 6, wherein the tag instructions comprise audible tag instructions.

8. The method of claim 7, wherein the audible tag instructions are inaudible by at least one of the plurality of communications devices.

9. A system comprising:
a processor; and
a computer-readable storage medium storing instructions which, when executed by the processor, cause the processor to perform operations comprising:
obtaining a first tag communication, the first tag communication being of a first type and comprising a first plurality of tags associated with a media event being of a second type and presented at a plurality of communications devices, wherein each tag in the first plurality of tags comprises a user-generated content item corresponding to a specific time index of the media event after the media event begins being presented;
identifying a communications device of the plurality of communications devices that is incompatible with the first type to yield an identified communications device, wherein the identified communications device is incompatible with the first type when the identified communications device is absent an ability to at least one of receive or process communications being of the first type;
generating a second tag communication of the second type that is compatible with the identified communications device, the second tag communication comprising a second plurality of tags based on the first plurality of tags, wherein (i) the first type is text and the second type is audio, or (ii) the first type is audio and the second type is text; and
delivering the second tag communication to the identified communications device.

10. The system of claim 9, wherein the computer-readable storage medium stores additional instructions which result in the operations further comprising:
selecting each of the second plurality of tags to comprise a content of at least one of the first plurality of tags.

11. The system of claim 9, wherein the identified communications device is identified based on a device authentication.

12. The system of claim 9, wherein the identified communications device lacks audio capability.

13. The system of claim 9, wherein the computer-readable storage medium stores additional instructions which result in the operations further comprising:
receiving tag instructions from the identified communications device;
assembling an updated first tag communication based on the tag instructions; and
generating the second tag communication and delivering the second tag communication based on the updated first tag communication.

14. The system of claim 9, wherein the computer-readable storage medium stores additional instructions which result in the operations further comprising identifying at least one of the first plurality of tags and generating the second tag communication based on the at least one of the first plurality of tags.

15. A system, comprising:
means for receiving a first tag communication, the first tag communication being of a first type and comprising a first plurality of tags associated with a media event being of a second type and presented at a plurality of communications devices, wherein each tag in the plurality of tags comprises a user-generated content item corresponding to a specific time index of the media event after the media event begins being presented;
means for identifying a communications device of the plurality of communications devices that is incompatible with the first type to yield an identified communications device, wherein the identified communications device is incompatible with the first type when the identified communications device is absent an ability to at least one of receive or process communications being of the first type;
means for generating a second tag communication of the second type that is compatible with the identified communications device, the second tag communication comprising a second plurality of tags based on the first plurality of tags, wherein (i) the first type is text and the second type is audio, or (ii) the first type is audio and the second type is text; and
means for delivering the second tag communication to the identified communications device.

16. The system of claim 15, further comprising:
means for selecting tag information associated with the media event to yield an identifier;
means for identifying a portion of the tag information based on the identifier.

17. The system of claim 16, wherein the means for identifying the portion of the tag information further comprises means for selecting tag information received within a selected time interval.

18. The system of claim 15, wherein the second tag communication comprises an audible tag communication.

19. The system of claim 18, wherein a first audio volume of at least a portion of the audible tag communication is different than a second audio volume of at least one of the media event and a default tag communication.

20. The system of claim 15, wherein the means for delivering the second tag communication further comprises means for integrating the second tag communication into a media stream of the media event being delivered to the identified communications device.

* * * * *